US008015505B1

(12) United States Patent
Philbrick et al.

(10) Patent No.: US 8,015,505 B1
(45) Date of Patent: Sep. 6, 2011

(54) MANAGEMENT OF COMMANDS GENERATED THROUGH USER INTERFACE DIALOGS

(75) Inventors: Kenneth Philbrick, Seattle, WA (US); David E. Williamson, Redmond, WA (US); Roey Horns, Seattle, WA (US)

(73) Assignee: Adobe Systems Incorporated, San Jose, CA (US)

(*) Notice: Subject to any disclaimer, the term of this patent is extended or adjusted under 35 U.S.C. 154(b) by 325 days.

(21) Appl. No.: 12/350,167

(22) Filed: Jan. 7, 2009

Related U.S. Application Data

(63) Continuation of application No. 10/858,874, filed on Jun. 1, 2004, now Pat. No. 7,478,342.

(51) Int. Cl.
*G06F 3/048* (2006.01)
(52) U.S. Cl. ............................ 715/809; 715/802; 715/808
(58) Field of Classification Search .................. 715/802, 715/804, 808, 809
See application file for complete search history.

(56) References Cited

U.S. PATENT DOCUMENTS

| | | | |
|---|---|---|---|
| 5,119,476 A | | 6/1992 | Texier |
| 5,579,466 A | * | 11/1996 | Habib et al. ................... 715/210 |
| 5,583,982 A | | 12/1996 | Matheny et al. |
| 5,870,088 A | | 2/1999 | Washington et al. |
| 5,903,269 A | | 5/1999 | Poreh et al. |
| 6,061,059 A | * | 5/2000 | Taylor et al. ................... 715/764 |
| 6,239,796 B1 | | 5/2001 | Alexander |
| 6,523,134 B2 | * | 2/2003 | Korenshtein ..................... 714/16 |
| 6,731,309 B1 | * | 5/2004 | Unbedacht et al. ........... 715/765 |
| 6,944,612 B2 | * | 9/2005 | Roustant et al. .............. 707/706 |
| 2005/0210407 A1 | * | 9/2005 | Bates et al. ................... 715/809 |

OTHER PUBLICATIONS

Borland International, Inc. "Borland C++ User's Guide, Version 4.0, Chapter 15, Creating Dialog Boxes" 1993, pp. 221-255, 37 pages.
Burk, "World's Smallest Dynamic Dialog Editor GUI Programming", Windows-Dos Developer's Journal, V. 6, No. 9, Sep. 1995, 10 pages.
Volkman, "The Dialog Editor Controls Pack", Windows-Dos Developer's Journal, V. 5, No. 10, Oct. 1994, 4 pages.

* cited by examiner

*Primary Examiner* — Ba Huynh
(74) *Attorney, Agent, or Firm* — Fish & Richardson P.C.

(57) ABSTRACT

Systems and techniques manage commands generated through user interface dialogs. In general, in one implementation, commands resulting from interaction with controls of a dialog are received, and first and second commands are distinguished. The first command is held upon receipt to be performed later, and the second command is passed through the dialog to be performed upon receipt. Both of the commands are retained in a command sequence managed by a cancel control of the dialog. The dialog can include a preview control operable to specify whether effects of interaction with the controls are to be previewed. The first command can be subject to the preview control, while the second command is not subject to the preview control. Distinguishing between the commands can involve performing the second command but not the first command when the preview control specifies the effects of interaction are not to be previewed.

21 Claims, 3 Drawing Sheets

MANAGEMENT OF COMMANDS GENERATED THROUGH USER INTERFACE DIALOGS

CROSS REFERENCE TO RELATED APPLICATION

This application is a continuation of and claims benefit of the priority of U.S. patent application Ser. No. 10/858,874, filed Jun. 1, 2004 now U.S. Pat. No. 7,478,342, and entitled: Management of commands generated through user interface dialogs.

BACKGROUND OF THE INVENTION

The present application describes systems and techniques relating to graphical user interfaces, for example, software applications having user interface dialogs with preview capability.

Programmers often build an application program's graphic user interface (GUI) by assembling and tailoring prefabricated GUI controls (controls) found in libraries such as the Microsoft Foundation Class (MFC) library. Controls, such as buttons and scroll bars, implement predefined behaviors that a programmer can alter and supplement. In general, a control can create one or more commands, which typically represent one or more actions on a data model accessed through the GUI. A programmer can add a control to an application GUI through a visual development tool (e.g., Visual C++) or by entering instructions that call the control procedures.

A dialog panel control (dialog) produces an image of a box that includes other controls. Dialogs can be modal. A modal dialog prevents a user from interacting with application controls other than those associated with the dialog until the user closes the dialog. Programmers can add dialogs to their user interface to display and receive data from conceptually related items. For example, a drawing application might display a dialog when a user wants more information about a drawn object. This dialog might display the drawn object's attributes such as the drawn object's color and size and allow the user to alter them.

In a traditional dialog, the dialog's commands are typically wrapped in a sequence. Commands can be grouped in a sequence to effect complex actions in a software application. Typically, commands and command sequences are atomic in that they either succeed or they don't. Moreover, software applications typically support commands and command sequences being done, un-done, and re-done.

In previewable dialogs, a preview control is included in the dialog. A preview control, often a check box control labeled "preview", allows a user to see the effects dialog controls will have before closing the dialog. For example, a user might want to alter a drawn object's color through a dialog. By turning the dialog's preview control ON, the user can select different colors and see the object rendered in each color before settling on a particular color. In some software development environments, a programmer writes special procedures to support previewable dialogs. In other software development environments, a dialog preview software component has been built into shared software libraries for use by programmers to quickly add preview capability in a dialog of a software application. For example, see U.S. Pat. No. 6,061,059, issued May 9, 2000, and entitled, "Providing A Preview Capability To A Graphical User Interface Dialog".

SUMMARY OF THE INVENTION

In general, in one aspect, the invention features systems and techniques relating to management of commands generated through user interface dialogs. According to an aspect, commands resulting from interaction with controls of a software interface dialog are received, and a first command is distinguished from a second command. The first command is held upon receipt, in at least one circumstance, to be performed later, and the second command is passed through the dialog to be performed upon receipt. Both the first command and the second command are retained in a command sequence managed by a cancel control of the dialog. The dialog can include a preview control operable to specify whether effects of interaction with the controls are to be previewed as interaction with the controls occurs. The first command can be subject to the preview control, while the second command is not subject to the preview control, the first and second commands being additional to one or more commands affecting the preview control. Distinguishing between the commands can involve performing the second command but not the first command when the preview control specifies the effects of interaction are not to be previewed.

Receiving the commands can involve receiving pass-through and preview commands, including the first and second commands, in any order, and the preview commands can be done and undone in response to changes to the preview control. Retaining commands in the command sequence can involve prioritizing pass-through commands over preview commands. Performing the second command can involve forwarding the second command from a dialog command manager to an application command manager.

The first command can be received before the second command, and the distinguishing between commands can involve performing the first command upon receipt when the preview control specifies the effects of interaction are to be previewed, undoing the first command in conjunction with receipt of the second command, performing the second command after undoing the first command, and redoing the first command after performing the second command, wherein the second command precedes the first command in the command sequence. Moreover, undoing the first command can involve undoing the first command upon receipt of a pass-through control command received between the first and second commands.

The distinguishing between commands can involve identifying one or more pass-through control commands received in connection with the second command. This can involve receiving a pass-through enable command before, and a pass-through disable command after, receipt of the second command. Additionally, the receiving can involve receiving preview-independent commands, including the second command, between receiving the pass-through enable and pass-through disable commands, where the preview-independent commands are from a child dialog.

According to another aspect, a software product, tangibly embodied in a machine-readable medium, provides a dialog preview capability and includes instructions operable to cause a machine to buffer and manipulate commands produced by dialog controls to provide the preview capability in a dialog including a preview control, wherein the dialog preview capability allows at least one of the commands produced by the dialog controls to be performed from the dialog independent of a current preview state in the dialog while retaining the at least one of the commands along with other commands in a command sequence managed by a cancel control of the dialog. The buffering and manipulation of commands can involve performing a first set of commands when the dialog is in a preview state; performing a second set of commands, as the second set of commands are received, irrespective of the current preview state in the dialog, wherein performing the second set of commands involves first undoing and later redoing the first set of commands when the dialog is in the preview state, resulting in the second set of commands preceding the first set of commands in a command sequence corresponding to the dialog; and undoing and redoing the first set of commands, but not the second set of commands, in response to a transition of the current preview state from the preview state to a non-preview state and back to the preview state.

The at least one of the commands can be performed by forwarding the at least one of the commands from a dialog command manager to an application command manager. The dialog command manager can identify the at least one of the commands to be performed from the dialog independent of a current preview state in the dialog based on one or more received null commands indicating the at least one of the commands are preview-independent.

According to another aspect, a system includes a processor operable to perform software routines; and a machine-readable medium tangibly embodying shared software routines that include a dialog routine to provide a preview control operable to specify whether effects of interaction with a dialog are to be previewed during the interaction, wherein the dialog routine includes instructions that enable a subset of the interactions to be performed from the dialog independent of a current preview state in the dialog and instructions that cause the subset of the interactions to be undone if the dialog is cancelled. The shared software routines can include software routines in a dynamic link library shared by multiple software applications in the system. The dialog routine can include a dialog command manager that is installed if a dialog includes a preview control and that manages commands generated via the dialog based on whether received commands are subject to the preview control. Commands that are not subject to the preview control can be forwarded by the dialog command manager to an underlying application routine where the preview-independent commands are performed on a data model of the application irrespective of a current preview state of the dialog. The dialog command manager can retain preview-independent commands earlier in a command sequence for the dialog than preview-dependent commands retained in the command sequence, irrespective of an order of receipt of the preview-independent and preview-dependent commands. Moreover, the subset of the interactions can include interactions with a child dialog.

The invention can be implemented to realize one or more of the following advantages. A software architecture can include a user interface and command do/undo system that enables commands to pass through a preview-state dialog to be executed regardless of the dialog's current preview state; canceling the dialog or undoing/redoing the dialog also undoes the executed pass-through commands. This can result in a flexible user interface and command do/undo architecture that can be readily integrated with numerous dialogs in a software application, can provide an easy and consistent foundation upon which dialog previews can be implemented, can streamline end user workflows, and can help improve performance and provide a consistent user experience. The software architecture can simplify software development, reducing the time needed to generate new software and making such software easier to maintain (debug, enhance, etc.) later. Moreover, by implementing pass-through commands that change the underlying data model, and not having to simulate the effects of the pass-through commands, the results shown to the user are exactly the result obtained when the OK button is pressed in the dialog, eliminating a possible source of errors.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files. The term "data model" means a set of electronic data, which can be representative of a document, held in memory for use by a software program.

Figure 1:
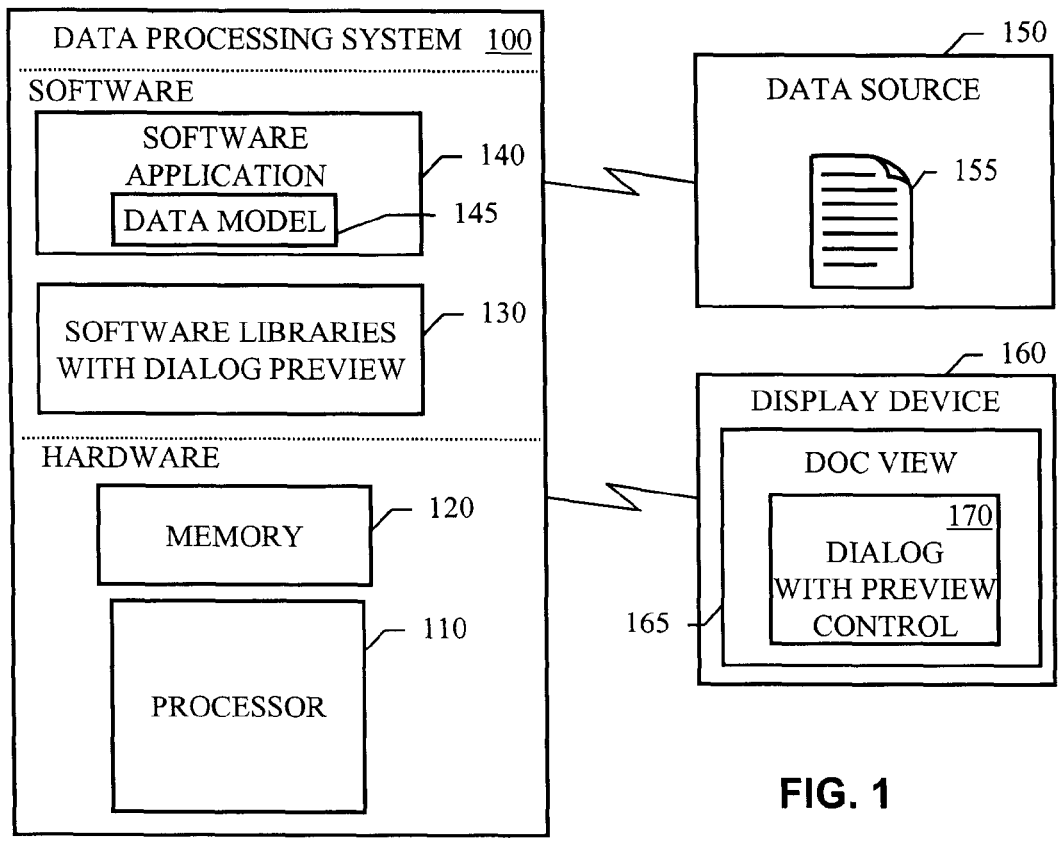
FIG. 1 is a block diagram of a data processing system employing a dialog with preview control.

FIG. 1 is a block diagram of a data processing system 100 employing a dialog with preview control 170. The system 100 includes hardware, including processor 110 and memory 120, and software, including software libraries 130 (e.g., dynamic link libraries that different applications can access when needed) and a software application 140 (e.g., a design program for use in print and/or electronic publishing). Additionally, the system 100 is in communication with a data source 150 and a display device 160, either or both of which can be part of the system 100. The data source 150 provides a document 155 and can be one or more network source(s) or local storage device(s) (e.g., a hard disk integrated with the system 100 into a machine, such as a personal computer). The display device 160 provides a document view 165 in a GUI according to the software application 140. The display device 160 can be a remote device (e.g., a workstation accessed over a network) or a local device (e.g., a display integrated with the system 100 into a machine, such as a portable electronic device).

The display device 160 can present, in addition to the document view 165, the dialog with preview control 170. The dialog 170 exists as software in the system 100 and can be generated at least in part using one or more shared software routines for dialog preview in the software libraries 130. The dialog 170 can be used to generate a series of associated commands for the software application 140, where one or more of the generated commands can be independent of a current preview state in the dialog 170. These commands are referred to as pass-through commands herein because they pass through the dialog 170 to the software application 140 irrespective of the current preview state.

For example, when preview is off, a series of commands can be received and queued, including a pass-through command that is passed through to the application 140 and affects a change to a data model 145 while the dialog 170 is still open. This change to the data model 145 can then be automatically reflected in the document view 165 and/or in the dialog 170 according to a model view controller of the application 140. By making the changes to the data model 145 and letting the model view controller based application show the changes automatically, there is no need to simulate the changes created by commands in a dialog, which reduces the coding burden on the programmers when creating dialogs with preview control. The implementation described below uses the term "pass-through commands" to refer to the preview-state-independent commands of the present application, but the term "pass-through" is not intended to be limiting; for example, alternative embodiments include those in which all commands received via a dialog pass through to the application, which can then perform the operations described herein.

Figure 2:
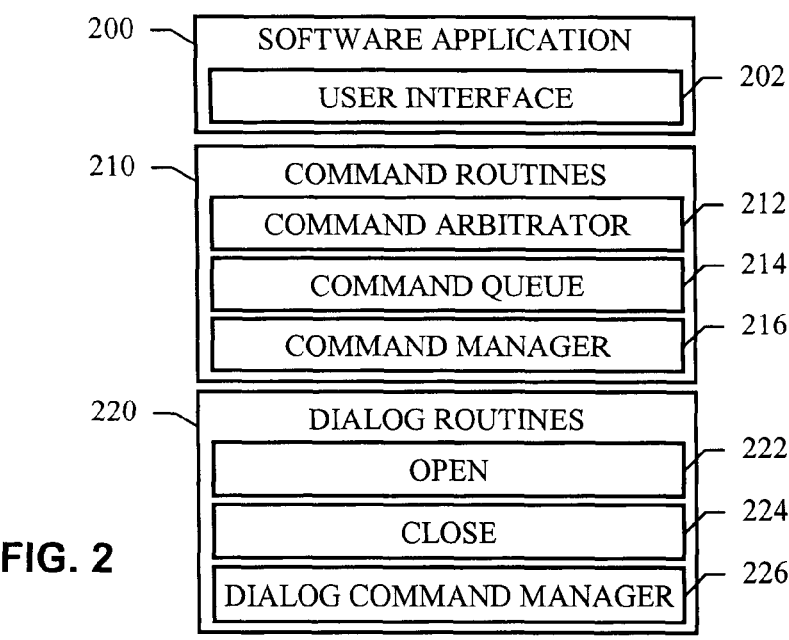
FIG. 2 is a block diagram illustrating a software architecture as can be used in the system of FIG. 1.

FIG. 2 is a block diagram illustrating a software architecture as can be used in the system of FIG. 1. A software application 200 includes a user interface 202 that includes controls for displaying and enabling user interaction with electronic documents, which can include text, images, sound, etc. User interaction with the controls of the user interface 202 can be accomplished using input devices (e.g., a keyboard and mouse), which are part of the data processing system 100. The shared software routines of the software libraries 130 can include command routines 210 that handle application commands, such as a command arbitrator 212, routine(s) that support a command queue 214, and a command manager 216. The shared software routines can also include dialog routines 220 that implement the dialog control. The routines 220 can include an open routine 222, a close routine 224, and a dialog command manager 226.

The dialog command manager 226 can be executed whenever a dialog includes a preview control. The dialog command manager 226 intercepts the commands generated via the dialog and controls when and how those commands are sent to the command manager 216 to be done. If preview is on, the dialog command manager 226 provides both pass-through commands and preview commands to the command manager 216 to be performed, and these commands are kept track of by the dialog command manager 226 so they can be undone if the dialog is canceled, or the preview commands can be undone if the preview control is toggled off. Thus, the dialog command manager 226 supports preview-independent commands, which are passed through the dialog to be performed regardless of the current preview state, where the preview-independent commands are also retained in a command sequence managed by a cancel control of the dialog.

Figure 3:
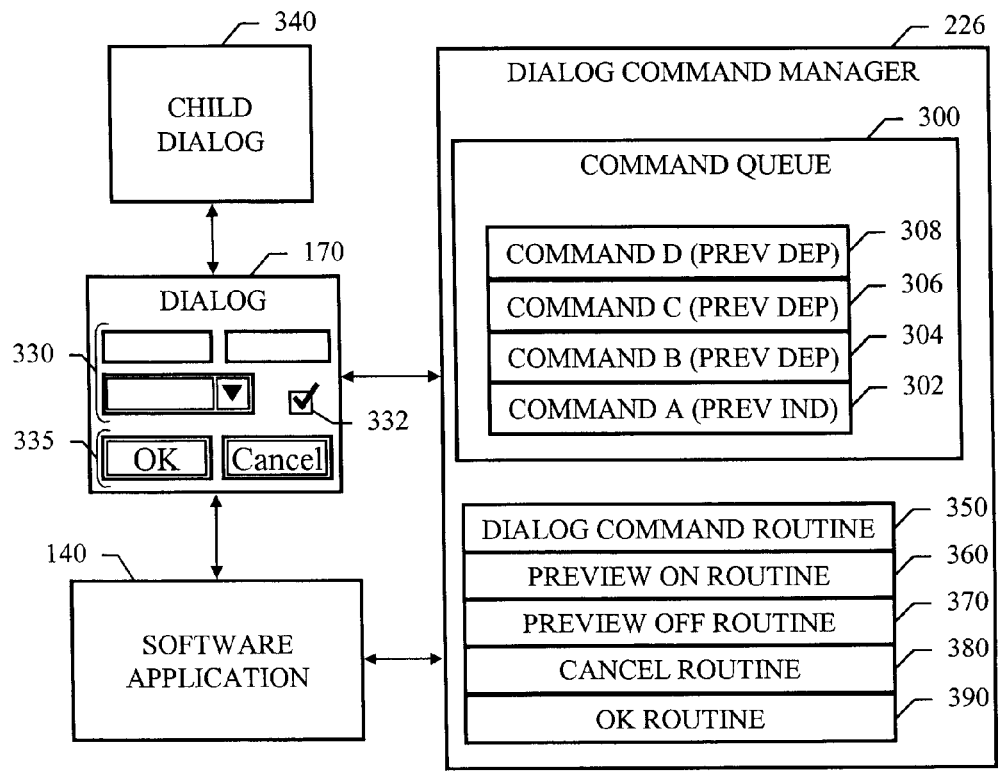
FIG. 3 is a block diagram illustrating a dialog, a dialog command manager, and a software application interacting with each other.

FIG. 3 is a block diagram illustrating a dialog 170, a dialog command manager 226, and a software application 140 interacting with each other. The dialog 170 has multiple controls 330 (e.g., text entry controls, pull-down menu control, etc.), including a preview control 332 in the form of a check box. The dialog 170 also has OK button and Cancel button controls 335. A programmer builds the dialog 170 by tailoring and adding the different controls to a dialog control. The programmer can quickly add and remove the preview control the same way the programmer adds and removes the other controls (e.g. dragging a control from a palette in a visual development environment). Thus, development of dialogs occurs independent of the dialog's preview capability. Additionally, the programmer need not be aware of how the preview control is implemented, that is, a programmer needs no knowledge of any of the dialog routines used to produce a previewable dialog.

Manipulation of the controls of the dialog 170 produces commands, which are intercepted, buffered and manipulated by the dialog command manager 226. Generated commands can affect the electronic document, the data model, and/or the user interface. Generated commands can have multiple associated routines (e.g., do, redo, and undo routines) and multiple available states in which the commands can be (e.g., a not yet done state, an already done state, a not yet undone state, an undone state, a not yet redone state, or a redone state).

The dialog command manager 226 can include a dialog command queue 300, a dialog command routine 350, a preview on routine 360, a preview off routine 370, a cancel routine 380, and an OK routine 390. The dialog command queue 300 stores commands produced by dialog controls and may use one or more pointers to identify locations in the queue, such as the location of the most recent pass-through command. The dialog command routine 350 pushes commands received by the dialog command manager 226 onto the dialog command queue 300 based on whether or not the commands are subject to the preview control 332. If a command is not subject to the preview control, that command can be executed after it is received regardless of the current preview state. If a command is subject to the preview control, that command can be executed when the dialog is in the preview state.

For example, a command that loads information into the data model of the software application to be manipulated by the dialog using other dialog control (e.g., a load styles command in a styles definition dialog of a design program) should not be subject to preview control because such a command needs to be performed as soon as it is received regardless of the preview state of the dialog. By providing a user interface programming architecture with dialog preview control capability that can handle such commands, a preview control can be easily added to existing dialogs that generate commands which should be preview-independent. These preview-independent commands can be maintained in the same command sequence as the other commands generated by the dialog, and commands generated by a dialog can be managed by the dialog's Cancel button.

As shown in FIG. 3, the dialog command queue 300 currently holds four commands: a preview-independent command 302 and three preview-dependent commands 304-308. Preview-independent commands can be distinguished from preview-dependent commands in a number of ways, but in general, either the commands themselves, or the controls of the dialog, can indicate whether the commands are subject to preview control. In the latter case, the dialog 170 can indicate to the dialog command manager 226 that one or more commands are preview-independent commands using one or more null commands.

A null command is an identifiable command that has no function with respect to a data model of interest. One or more null commands can thus be used to send messages to the dialog's command interceptor. For example, two null commands can be designated for use in turning on and off command pass through functionality in the dialog command manager 226. One or more commands to be passed through to the software application 140 can be preceded by an EnablePassThrough null command and followed by a DisablePassThrough null command. Thus, any command can pass through the dialog simply by wrapping the command(s) in begin/end null commands. This can be of particular use in nesting dialogs.

The dialog 170 can launch a child dialog 340 and make all the commands of that child dialog 340 be pass-through commands so that commands generated by the child dialog 340 are not dependent on the preview state of the parent dialog 170. For example, the dialog 170 can be a define styles dialog used to define a paragraph style. As part of the paragraph style being defined, a user may wish to create a new color. The child dialog 340 can be a define color dialog opened from within the dialog 170 using the pass-through functionality of the dialog command manager 226. In this way, the new color is actually created in the underlying data model and is then visible within the dialog 170 and/or the application user interface seen behind the dialog 170 on the screen (e.g., the new color creation may be reflected in the new color's appearance in a swatches pallet that may be in view on the screen).

Both dialogs 170, 340 can be modal dialogs. When the OK button in the child dialog 340 is pressed, the new color can be used by additional generated commands from within the dialog 170, and yet the new color is eliminated if the dialog 170 is cancelled. This simplifies the programmer's job, as multiple dialogs can be nested, and everything done in a child dialog can result in an immediate affect on the data model and also be automatically made part of the command sequence of the parent dialog. This creates a very flexible previewable dialog system, allowing programmers to readily reuse other parts of the software application that may have no instructions relating to preview control at all.

In general, pass-through commands are performed upon receipt, while regular preview commands are performed upon receipt only if preview control is turned on in the dialog. When the preview control is turned off, the preview commands are undone, while the pass-through commands remain in the done state; and when the preview control is then turned back on, the preview commands are redone. This can result in out of order command execution, which means the dialog command manager 226 should manage the two types of commands to be largely independent of each other. The commands in FIG. 3 are given alphabetic characters A-D according to the order in which they are received by the dialog command manager 226. In the example shown, all the commands 302-308 have been performed because the preview control 332 is on, and the dialog 170 is still open.

The dialog command manager 226 can maintain a queue and count of the currently executed preview and pass-through commands. In a preview state, both types of commands are recorded and executed; in a non-preview state, preview commands are recorded but not executed and pass-through commands are recorded and executed. After the dialog command manager receives an EnablePassThrough null command and/or a first pass-through command, the dialog command manager can undo all executed preview commands (if any), until the queue only contains executed pass-through commands, and then execute the new set of pass-through commands, inserting them into the queue before the undone preview commands. Upon receiving the DisablePassThrough null command, the dialog command manager can check if preview is on, and if so, redo the pending preview commands.

With respect to redoing of commands using a programmatic approach as opposed to a reverting to known document state approach, the commands can be designed to have Do, Undo and Redo methods, or they can be designed to have Do and Undo methods but no Redo method. In the later case, code that needed to "re-do" a command would call the Do method, where Do in the command is implemented such that it executes correctly in the case of being called after Undo. This distinction is important as there may be cases where there are slight interactions between the preview and the pass-through commands. Redo is normally implemented to revert the Undo operation. However, if a pass-through command changes the state of the model in a way the preview command cares about, calling Redo might give incorrect results, whereas calling Do again would succeed. For example, a rename color command may take the old and new color name, but in it's Undo and Redo methods the command may choose to store the index of the altered color and the name to change it back to. As long as the content of the color list doesn't change, this approach would work. However, if a pass-through command adds a color to the color list the Redo method of the rename color command might operate on the wrong color (by index), whereas calling Do would repeat the conversion of color name to index and thus work correctly. Thus, as used herein, "redoing" of a command is not limited to using a Redo routine of a command with a programmatic approach to undo/redo functionality.

Both pass-through commands and preview commands are retained in a command sequence managed by the OK and Cancel controls 335 of the dialog 170. If OK is pressed and the dialog is not being previewed, the pending preview commands are executed. If Cancel is pressed, the entire sequence is aborted, resulting in both the pass-through commands and the preview commands being undone. Moreover, the command queue 300 can be multiple queues, such as a first queue to retain pass-through commands and a second queue to retain preview commands; the command rollback approach need not be used. But even in this case, both types of commands can be retained in a command sequence managed by the OK and Cancel controls 335 of the dialog 170. Thus, both pass-through commands and preview commands can be bundled together, and an "Undo dialog" menu selection can be created, after clicking the OK button of the dialog 170, regardless of how the dialog command manager 226 handles the two types of commands internally.

Figure 4:
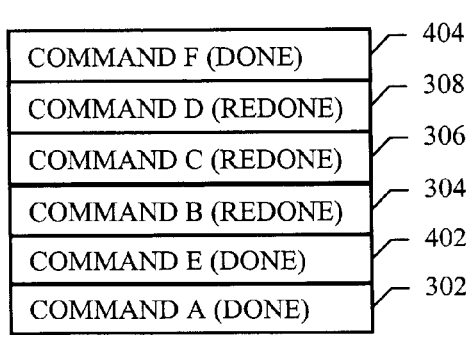
FIG. 4 illustrates the dialog command queue of FIG. 3 after receipt of additional commands E and F.

FIG. 4 illustrates the dialog command queue of FIG. 3 after receipt of additional commands E and F, commands 402 and 404 respectively. Preview is kept on while the commands 402, 404 are generated. Command 402 is a preview-independent command, thus commands 304-308 are undone, command 402 is done, and then commands 304-308 are redone. After this, preview command 404 is done.

Figure 5:
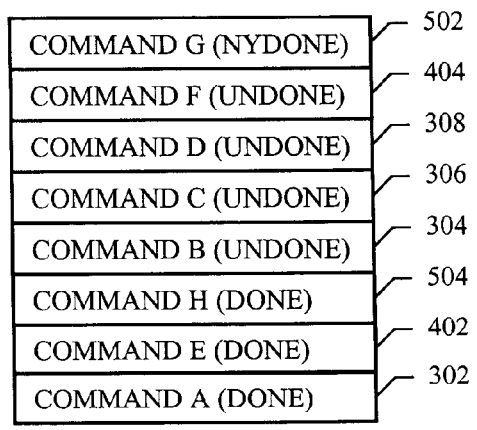
FIG. 5 illustrates the dialog command queue of FIG. 4 after receipt of additional commands G and H.

FIG. 5 illustrates the dialog command queue of FIG. 4 after receipt of additional commands G and H, commands 502 and 504 respectively. The preview is turned off before the commands 502, 504 are generated. This results in commands 304, 306, 308, 404 being undone. Preview command 502 is received and placed in the queue in a not yet done state. Then, pass-through command 504 is received, executed and inserted in the queue below all the preview commands.

As can be seen in FIGS. 4 and 5, the described command management results in commands being performed in a different order than they are received. While not required, this reordering of commands may be preferable in that it provides a more consistent view of the command sequence being generated through a dialog. In the traditional undo/redo paradigm, command execution order is important and should be preserved. For a command to be redone reliably, a common assumption is that the state of the command sequence view after a command is undone and redone should look identical with the sequence view after the command was originally done. However, in a previewable dialog where old commands can be reprocessed according to newly received commands, as mentioned above with the example of the line weight set command, the state of the command sequence view can already be changed on redo.

Keeping the pass-through commands in front of the preview commands causes the state of the command sequence view to be changed for the preview commands upon receipt of the pass-through commands, as illustrated between FIGS. 3 and 4, but this approach can also result in a simpler and better implementation of preview on/off toggling. The state of the command sequence stays the same for all pass-through commands, no matter how many pass-through and preview commands are generated, and no matter the order of these commands with respect to each other and with respect to any toggling of the preview control. Toggling of the preview control becomes simple and elegant because the command stack is just undone back to the point where only the pass-through commands are on the stack. Moreover, changing an existing preview command in the stack, as described above, is simpler than would be the case if the pass-through and preview commands were kept interleaved in the command stack.

Care should be taken in what types of commands are allowed to be preview-independent, as preview-dependent and preview-independent commands should not overlap in destructive ways in terms of their changes to the underlying model. For example, a preview-independent command for deleting a color should not be combined with preview-dependent commands for commands for editing colors. In general, preview-independent commands should only alter or add to the model, and not delete portions of the model.

The command pass-through system allows sets of commands to be executed immediately in a preview-state dialog regardless of the current preview state, keeping both the immediately executed commands and the preview commands in the same command sequence. By keeping the commands in the same sequence, the preview dialog can continue to function as expected, retaining the ability to be cancelled, undone, redone, and can be represented as a single entity on an application undo stack after the dialog is closed. Existing preview functionality is retained, and the systems and techniques described can be readily implemented in existing dialog preview architectures.

Figure 6:
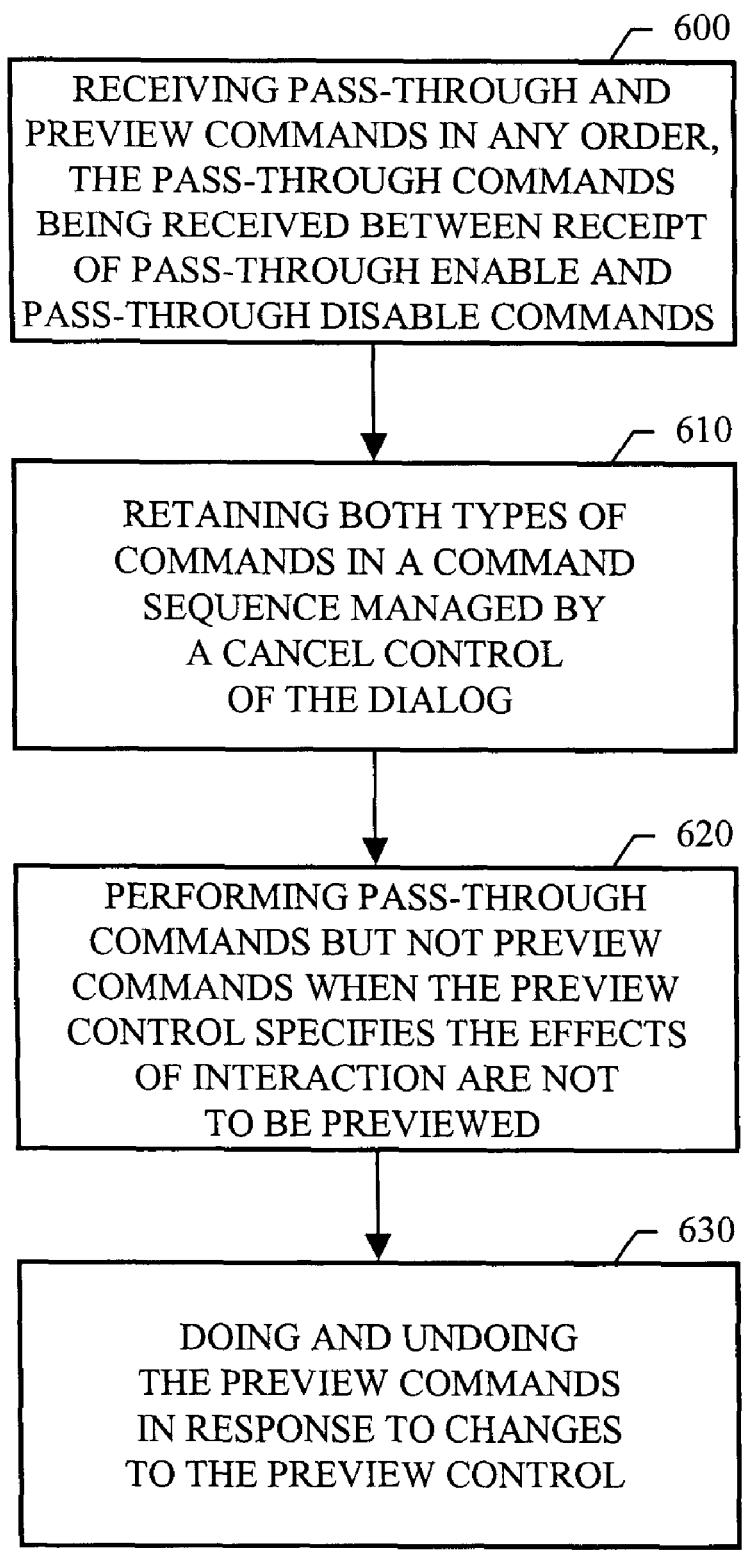
FIG. 6 is a flowchart illustrating a process of handling pass-through and preview commands received from a dialog with preview control.

FIG. 6 is a flowchart illustrating a process of handling pass-through and preview commands received from a dialog with preview control. Multiple pass-through and preview commands are received in any order at 600. The pass-through commands are received between receipt of a pass-through enable command and a pass-through disable command, which thus identify the pass-through commands. Moreover, the current preview state can be changed with the preview control at any point during receipt of pass-through and preview commands. This changing of the preview state can be performed using null commands generated by the preview control to communicate the preview state to the dialog command manager.

Both the pass-through and preview commands are retained in a command sequence managed by a cancel control of the dialog at 610. The commands can be prioritized in the command sequence by retaining the pass-through commands earlier in the command sequence for the dialog than the preview commands, as described above. When the preview control specifies the effects of interaction with the controls of the dialog are not to be previewed as interaction with the controls occurs, the pass-through commands, but not the preview commands, are performed. The pass-through commands remain done regardless of the changes to the preview control. The preview commands are done and undone in response to changes to the preview control at 630. Finally, the pass-through and preview commands are either committed to or aborted as a group in response to the dialog being closed.

The invention and all of the functional operations described in this specification can be implemented in digital electronic circuitry, or in computer hardware, firmware, software, or in combinations of them, such as the structural means disclosed in this specification and structural equivalents thereof. Apparatus of the invention can be implemented in a software product (e.g., a computer program product) tangibly embodied in a machine-readable storage device for execution by a programmable processor; and processing operations of the invention can be performed by a programmable processor executing a program of instructions to perform functions of the invention by operating on input data and generating output. The invention can be implemented advantageously in one or more software programs that are executable on a programmable system including at least one programmable processor coupled to receive data and instructions from, and to transmit data and instructions to, a data storage system, at least one input device, and at least one output device. Each software program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory, a random access memory and/or a machine-readable signal (e.g., a digital signal received through a network connection). Generally, a computer will include one or more mass storage devices for storing data files; such devices include magnetic disks, such as internal hard disks and removable disks, magneto-optical disks, and optical disks. Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and optical disks, such as CD-ROM disks. Any of the foregoing can be supplemented by, or incorporated in, ASICs (application-specific integrated circuits).

The invention has been described in terms of particular embodiments. Other embodiments are within the scope of the following claims. For example, a preview capability need not be included in the dialog, and the operations of the invention can be performed in a different order and still achieve desirable results.

What is claimed is:

1. A non-transitory machine-readable medium tangibly embodying a software product that provides a dialog preview capability and comprises instructions operable to cause a machine to buffer and manipulate commands produced by dialog controls to provide the preview capability in a dialog including a preview control, wherein the dialog preview capability allows at least one of the commands produced by the dialog controls to be performed from the dialog independent of a current preview state in the dialog while retaining the at least one of the commands along with other commands in a command sequence managed by a cancel control of the dialog.

2. The machine-readable medium of claim 1, wherein the at least one of the commands is performed by forwarding the at least one of the commands from a dialog command manager to an application command manager.

3. The machine-readable medium of claim 2, wherein the dialog command manager identifies the at least one of the commands to be performed from the dialog independent of a current preview state in the dialog based on one or more received null commands indicating the at least one of the commands are preview-independent.

4. The machine-readable medium of claim 1, comprising shared software routines including a dialog routine to provide the preview capability.

5. The machine-readable medium of claim 4, wherein the shared software routines comprise software routines in a dynamic link library shared by multiple software applications.

6. The machine-readable medium of claim 1, wherein preview-independent commands are retained earlier in the command sequence than preview-dependent commands retained in the command sequence, irrespective of an order of receipt of the preview-independent and preview-dependent commands.

7. The machine-readable medium of claim 1, wherein the at least one of the commands comprises commands of a child dialog.

8. A system comprising:
a processor operable to perform software routines; and
a machine-readable medium tangibly embodying shared software routines that include a dialog routine to provide a preview control operable to specify whether effects of interaction with a dialog are to be previewed during the interaction, wherein the dialog routine includes instructions that enable a subset of the interactions to be performed from the dialog independent of a current preview state in the dialog and instructions that cause the subset of the interactions to be undone if the dialog is cancelled.

9. The system of claim 8, wherein the shared software routines comprise software routines in a dynamic link library shared by multiple software applications in the system.

10. The system of claim 8, wherein the dialog routine comprises a dialog command manager that is installed if a dialog includes a preview control and that manages commands generated via the dialog based on whether received commands are subject to the preview control.

11. The system of claim 10, wherein commands that are not subject to the preview control are forwarded by the dialog command manager to an underlying application routine where the preview-independent commands are performed on a data model of the application irrespective of a current preview state of the dialog.

12. The system of claim 8, wherein the dialog routine retains preview-independent commands earlier in a command sequence for the dialog than preview-dependent commands retained in the command sequence, irrespective of an order of receipt of the preview-independent and preview-dependent commands.

13. The system of claim 8, wherein the subset of the interactions comprise interactions with a child dialog.

14. The system of claim 10, wherein the dialog command manager identifies at least one of the commands to be performed from the dialog independent of a current preview state in the dialog based on one or more received null commands indicating the at least one of the commands are preview-independent.

15. A machine-implemented method comprising:
providing a dialog preview capability for a user interface; and
buffering and manipulating commands produced by dialog controls to provide the preview capability in a dialog including a preview control, wherein the dialog preview capability allows at least one of the commands produced by the dialog controls to be performed from the dialog independent of a current preview state in the dialog while retaining the at least one of the commands along with other commands in a command sequence managed by a cancel control of the dialog.

16. The method of claim 15, wherein the at least one of the commands is performed by forwarding the at least one of the commands from a dialog command manager to an application command manager.

17. The method of claim 16, wherein the dialog command manager identifies the at least one of the commands to be performed from the dialog independent of a current preview state in the dialog based on one or more received null commands indicating the at least one of the commands are preview-independent.

18. The method of claim 15, wherein providing the dialog preview capability comprises providing shared software routines including a dialog routine to provide the preview capability.

19. The method of claim 18, wherein the shared software routines comprise software routines in a dynamic link library shared by multiple software applications.

20. The method of claim 15, wherein preview-independent commands are retained earlier in the command sequence than preview-dependent commands retained in the command sequence, irrespective of an order of receipt of the preview-independent and preview-dependent commands.

21. The method of claim 15, wherein the at least one of the commands comprises commands of a child dialog.

* * * * *